D. B. WHISTLER & J. E. McALLISTER.
REGISTER.
APPLICATION FILED AUG. 25, 1913.

1,188,122.

Patented June 20, 1916.
5 SHEETS—SHEET 3.

Inventors
David B. Whistler.
John E. McAllister.

Witnesses
George E. Ireland.
Harriet L. Hammaker.

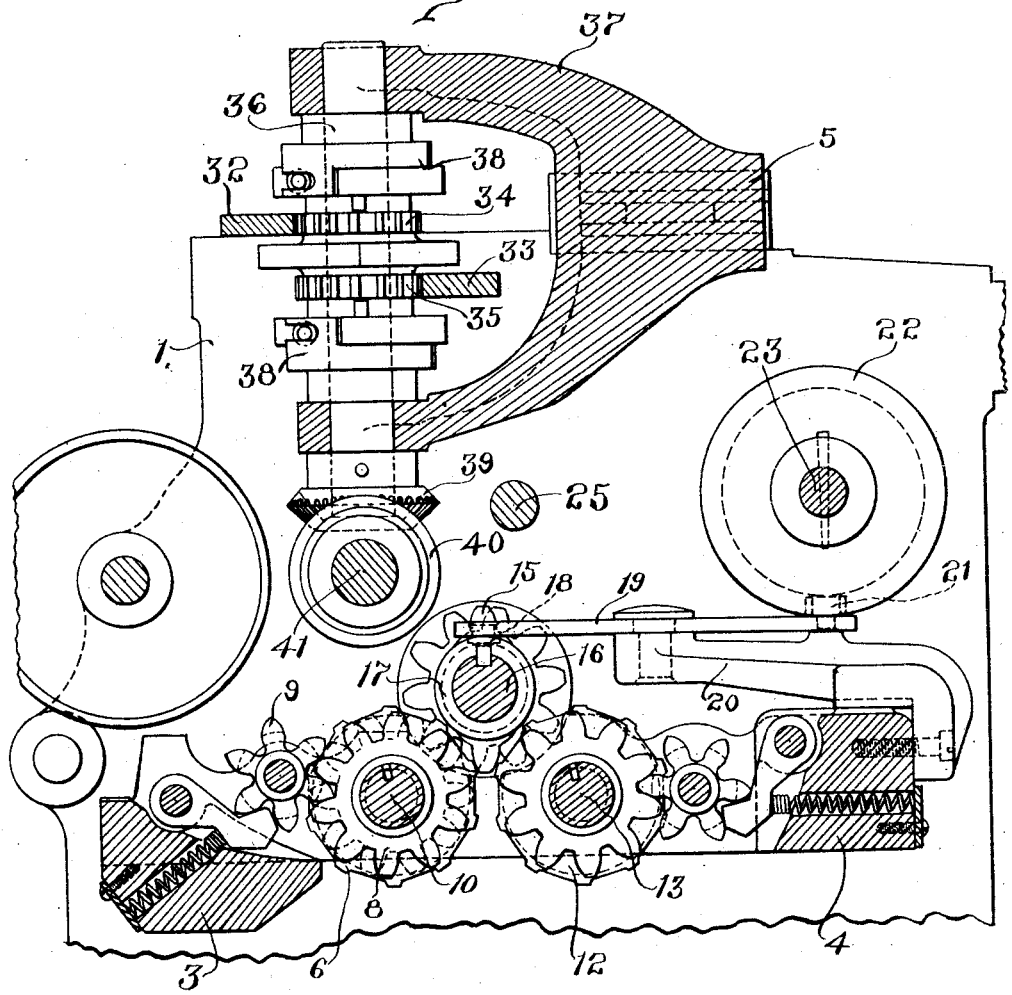

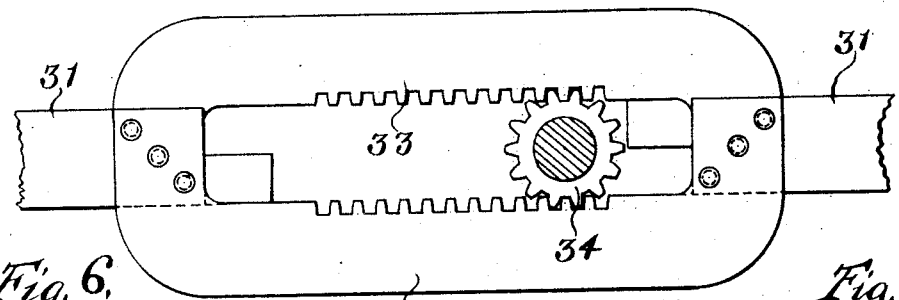
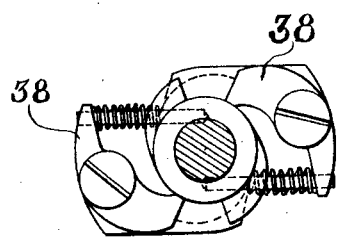
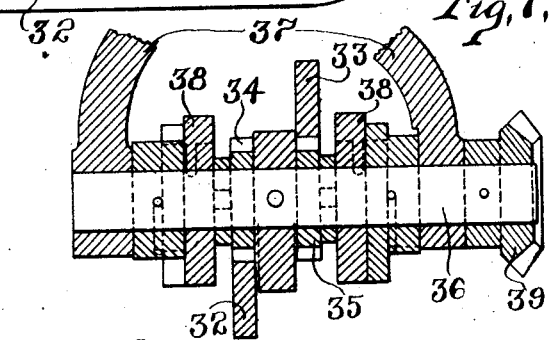
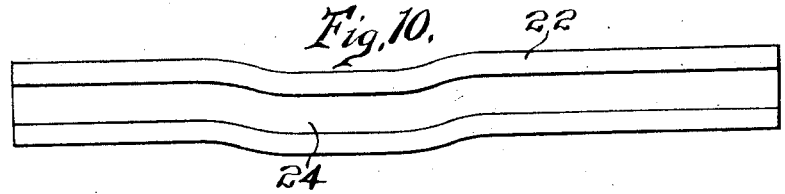
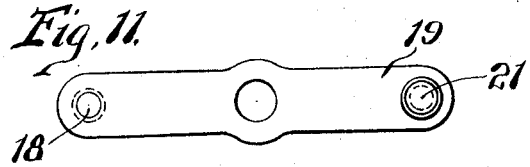

UNITED STATES PATENT OFFICE.

DAVID B. WHISTLER AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

REGISTER.

1,188,122.  Specification of Letters Patent.  Patented June 20, 1916.

Application filed August 25, 1913. Serial No. 786,383.

*To all whom it may concern:*

Be it known that we, DAVID B. WHISTLER and JOHN E. MCALLISTER, citizens of the United States, residing at Dayton, in the county of Montgomery and State of Ohio, have invented certain new and useful Improvements in Registers, of which the following is a specification, reference being had therein to the accompanying drawing.

This invention relates to registers and more particularly to registers of the type which embody a plurality of detail counters, the several counters being adapted to register different classes of items.

The object of the invention is to provide such a register having an actuating device for each counter with a single setting device or handle, the manipulation of which will move any one of said actuating devices into or out of operative relation with its counter.

It is also an object of the invention to provide such a mechanism which will be of a simple, durable construction and of such a character that it will not be easily broken or rendered inoperative by rough or improper usage.

Figure 1:
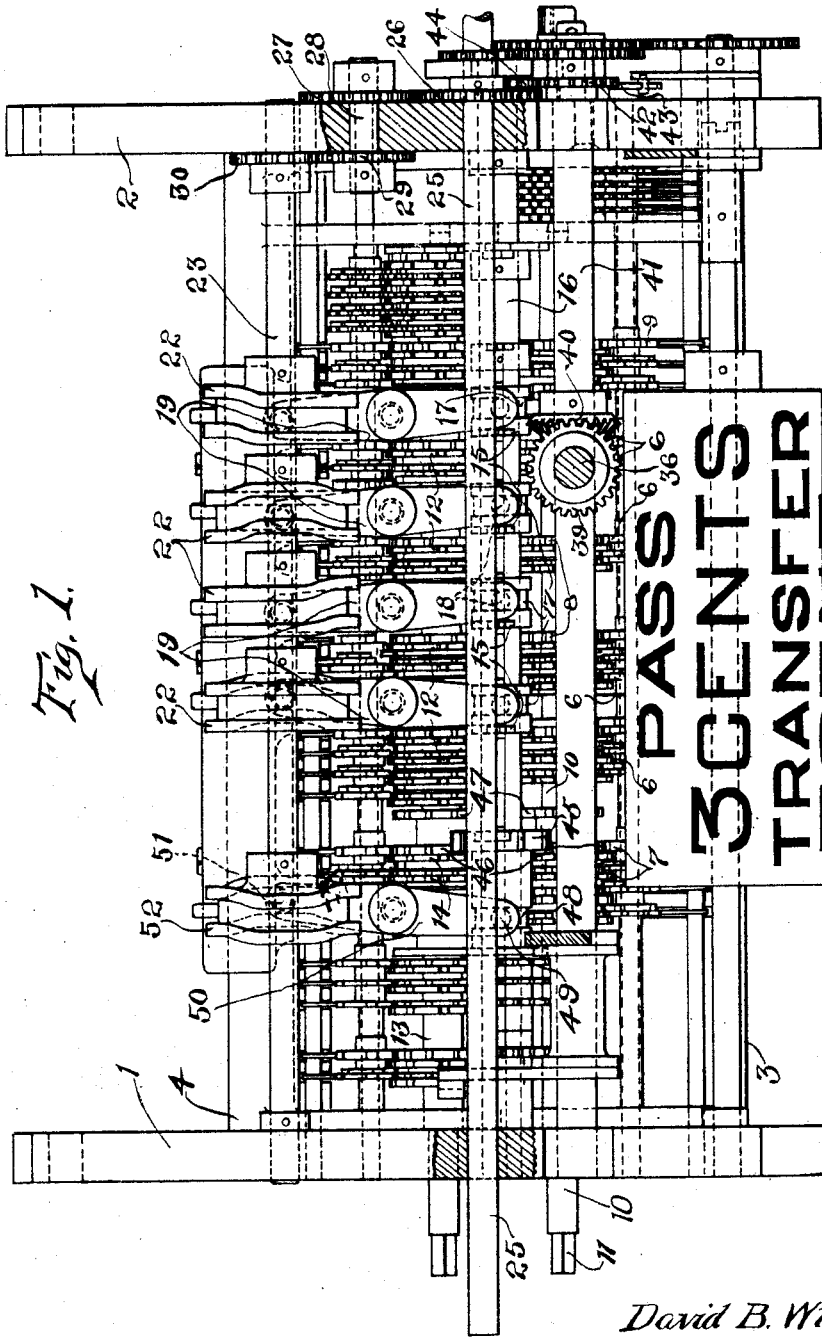
Figure 2:
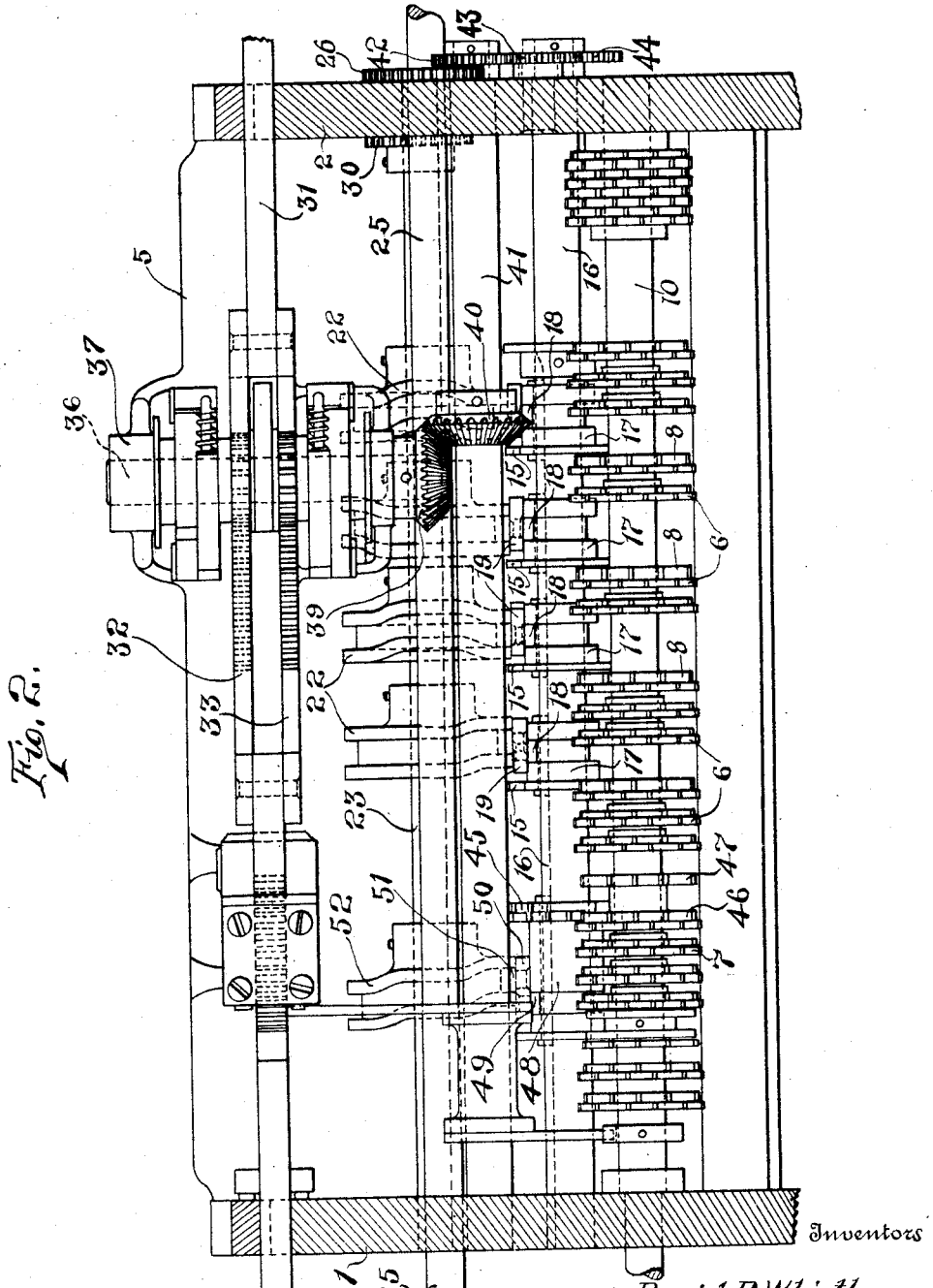
Figure 3:
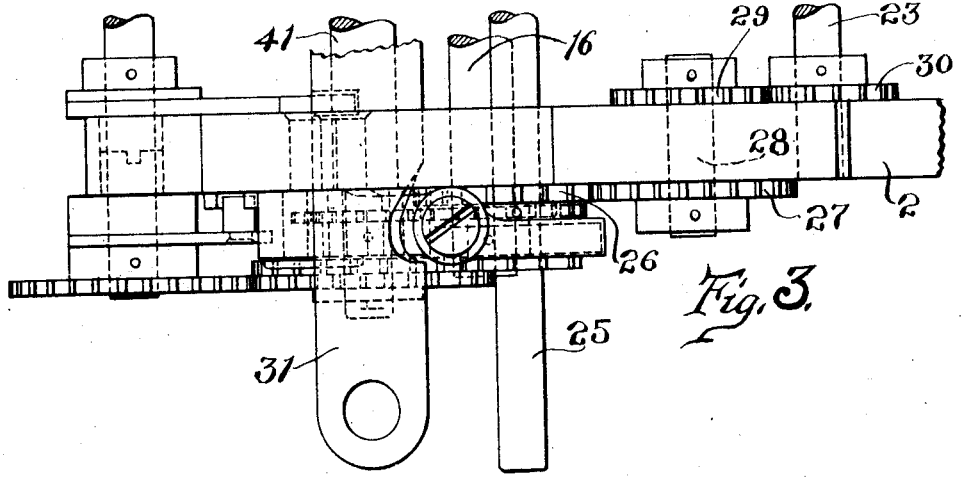
Figure 4:
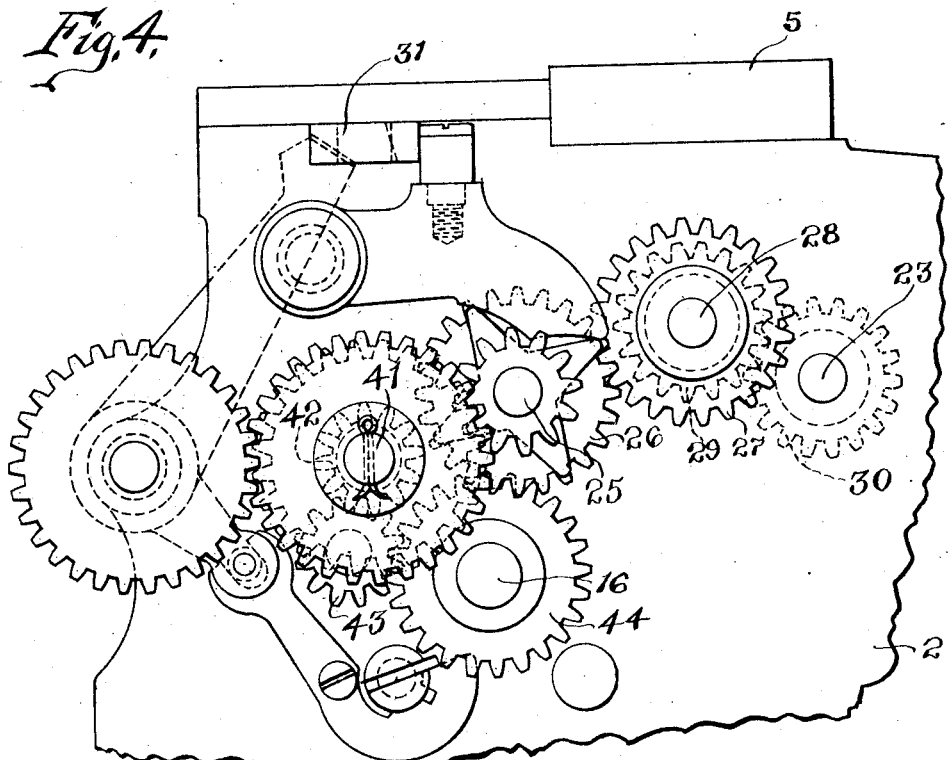

In the accompanying drawings, Figure 1 is a top, plan view of a fare register embodying the invention; Fig. 2 is a front elevation, partly in section, of such a register; Fig. 3 is a plan view of one end of the register; Fig. 4 is an end elevation of what is shown in Fig. 3; Fig. 5 is a sectional view taken transversely through such a register; Fig. 6 is a detail view of the double rack operating bar; Fig. 7 is a sectional detail view of the devices for transmitting movement from the operating bar to the actuators; Fig. 8 is a detail view of the pawl and ratchet mechanism forming a part of such transmission mechanism; Fig. 9 is a development of the cam for setting the actuator for the total cash counters; Fig. 10 is a development of one of the setting cams for the actuators of the trip counters; Fig. 11 is a plan view of one of the cam levers; and Fig. 12 is an edge view of the same.

In these drawings we have illustrated one embodiment of the invention and have shown the same as embodied in a multiple fare register, the main features of construction of which are well konwn. The register comprises a main frame consisting of end members 1 and 2 connected one to the other by a series of tie bars 3, 4 and 5. Mounted upon this frame are the several operative parts of the machine. The present register is adapted to preserve a classified trip record of four different kinds of fares and a trip record of the total cash, and also to preserve a classified total record of the same items, together with such other items as it may be desirable to record. To this end the register is provided with four counters which are indicated by the reference numeral 6, each of these counters being adapted to register a single class of fares, such, for example, as five cent fares, three cent fares, tickets and transfers, respectively. The register has another counter, indicated at 7, for registering the total amount of cash represented by the fares registered on the three and five cent fare counters. These counters are of a well known construction and each comprises a plurality of counter wheels which, in the present instance, are in the form of printing disks and the units counter wheel of each counter has secured thereto a gear, as indicated at 8, adapted to be engaged by a toothed actuator. The count is transferred from the units counter wheel to the tens counter wheel, and so on, by any well known transfer mechanism. In the present instance the transfer mechanism comprises transfer wheels 9 arranged on an axis parallel with the axis of the counter wheels. The several trip counters are, as indicated by the term "trip counter", adapted to register the fares collected upon each trip and to be reset at the end of each trip. To this end they are mounted upon a resetting shaft 10 rotatably mounted at its ends in the frame members 1 and 2 and having one end squared, as indicated at 11, to enable it to be engaged by a wrench and rotated to reset the counters to zero. This resetting mechanism may be of any well known character and as that here shown forms no part of the invention it is not necessary to describe it in detail. The present machine also comprises a second series of counters 12 corresponding in number to the trip counters and adapted to register the total number of fares or items registered by the trip counters for a period including two or more trips. These total counters are of a construction similar to the construction of the trip counters and are mounted upon a resetting shaft 13, also similar to the resetting shaft 10, to enable them to be reset to zero when desired. A total cash counter 14 is also mounted upon the resetting shaft 13 to register the total amount of cash received during the same period of time.

The counters may be actuated in any suitable manner which will permit of the selection of the counter corresponding to the fare which has been received and the operation of that counter. Preferably, however, a separate actuator is provided for each trip counter and this actuator is movable into and out of operative relation with its counter by means of a suitable setting device which is common to all the actuators and by means of which any one of the several actuators may be selected and moved into operative relation with its counter. In the present instance, we have provided each counter with a separate actuator, which actuators are in the form of two toothed gears 15 slidably mounted on and adapted to rotate with an actuator shaft 16 mounted above and on an axis between the vertical planes of the axes of the resetting shafts, whereby the actuator is enabled to engage, upon each operation, the gears of the units counter wheels of the corresponding trip and total counters. It is desirable that the operator, or in the case of a fare register, the conductor, should be able to select any fare which is to be registered by the manipulation of a single setting device. Consequently, such a device is provided in the form of a rotary handle, the movement of which to different positions will cause different ones of the actuators to assume operative positions with relation to the respective counters. As stated, each actuator 15 is slidably mounted on the actuator shaft 16 and is held against rotation relatively thereto. Consequently, each actuator may be moved axially to shift it into and out of operative position and may be actuated by the rotation of the actuating shaft. Of course, all the actuators rotate simultaneously but only that actuator which is in operative position will engage the gear wheel of its counter. While various devices may be provided for imparting axial movement to the several actuators that which I have herein shown and will now proceed to describe is very simple both in construction and operation and is of such a character that it is not easily broken or rendered inoperative, no matter how rough the usage to which it may be subjected. Further, it is absolutely positive in its operation and there is no possibility of its failing to set the selected actuator in proper position. The device which has been herein employed consists of a series of cams each connected with its respective actuator by means of a lever. The details may be varied but as here shown each actuator 15 is rigidly secured to a grooved collar 17, the groove of which is adapted to receive a pin 18 secured to the adjacent end of a lever 19. These levers are mounted within the machine in any suitable manner, but as here shown a bracket 20, for each lever 19, has been rigidly mounted on the tie bar 4 of the main frame and the levers are mounted between their ends on the respective brackets so as to move about vertical axes. The rear ends of the levers are provided with pins 21 which enter the grooves in the respective cams 22. In that form of the device here shown there is a cam 22 for each actuator and the several cams are rigidly secured to a single shaft 23. The style of the cam may vary but the cam here used has a peripheral groove which is straight for the greatest portion of its length and is provided with a single offset portion, as shown at 24 in the development of the cam shown in Fig. 10. The offset portions of the several cams are arranged in different positions with relation to the circumference of the shaft 23 and, consequently, as the shaft 23 and the several cams are rotated the offset portions of the cams will rock the respective levers at different times. Thus, by moving the shaft 23 to one of four predetermined positions, which positions may be indicated on the exterior of the register in any suitable manner, a selected one of the actuators may be placed in such a position that when the actuator shaft is rotated the counter corresponding to that actuator will be advanced one point. Rotary movement may be imparted to the cam shaft 23 by any suitable means. In the present instance, however, this movement is secured from a setting shaft 25 which is journaled in the end walls and projects beyond one or both of the walls to enable it to be operatively connected with suitable rotating devices mounted externally of the register. In the case of a fare register this device might be any one of a number of well known operating mechanisms which are mounted within the car for the purpose of setting and operating the register. It is not thought necessary to here illustrate any particular form of operating mechanism. Movement is transmitted from the setting shaft 25 to the cam shaft 23 by means of a train of gearing which is illustrated as comprising a gear 26 rigidly secured to the setting shaft and meshing with a gear 27 on a stud 28 journaled in the frame member 2 and having also mounted thereon a gear 29 which meshes with a gear 30 rigidly secured to the cam shaft. The ratio of the several gears may be such that the rotation of the cam shaft will be the same as the rotation of the setting shaft, or one shaft may have a greater rotation than the other, if this should be deemed desirable. Thus, it will be seen that by the manipulation of a single setting device, the shaft 25, which is common to all the actuators, a selected one of these actuators may be moved into operative relation with its counter.

The selected actuator having been moved into operative relation with its counter rotary movement may be imparted to the actuator shaft and the actuator to actuate the counter, in any suitable manner. In the present instance the mechanism employed for imparting rotary movement to the actuator shaft 16 is substantially that shown and described in Patent No. 990,666, granted to Ohmer, Whistler and McAllister April 25th, 1911. This mechanism consists, briefly, of a slide bar 31 mounted in the end members of the main frame and adapted to be connected with the operating mechanism before mentioned as arranged outside the register and to be actuated by that mechanism. This slide bar is provided with two racks 32 and 33 arranged parallel one with the other but in different planes. These racks mesh respectively with gears 34 and 35 loosely mounted on a shaft 36 journaled in a yoke 37 carried by the tie bar 5. These gears are connected to the shaft by means of oppositely arranged pawl and ratchet mechanisms, one of which is shown at 38 in Fig. 8, whereby the shaft 36 is rotated in a single direction by the movement of the rack bar in both directions, thus enabling the complete reciprocatory movement of the rack bar to be utilized to impart the desired movement to the shaft 36. The shaft 36 has at its lower end a bevel gear 39 meshing with a corresponding gear 40 on a shaft 41, this latter shaft being journaled in the end members of the main frame. The shaft 41 is connected with the actuator shaft 16 to cause the latter to rotate to the desired extent on each operation of the slide bar. This connection preferably comprises a train of gearing and as here shown the shaft 41 has secured thereto on the exterior of the frame member 2 a gear 42 which meshes with an idle gear 43 loosely mounted on the frame member and meshing in turn with a gear 44 on the actuator shaft 16. The ratio of the gears is such that the actuator shaft will be rotated through a half revolution for each complete reciprocation of the slide bar, thus causing the double toothed actuator to move both the trip counters and the total counters, for the selected fare, a single space.

The trip total cash counters are actuated upon each operation of one of the cash fare counters to add to said total cash fare counter the number of units equal to the value of the fare received, which, in the present machine, would be either three cents or five cents. This is accomplished by an actuator gear 45 similar to that shown and described in the patent above mentioned. Briefly, the units counter wheel of the total cash counter has two actuating gears both rigidly secured thereto and spaced apart, as indicated at 46 and 47. The actuator 45 is slidably mounted on the shaft 16 and held against rotation relatively thereto and this actuator comprises two portions, one having three teeth and the other having five teeth. When in its idle position the actuator lies between the two gears 46 and 47. When the actuator for the three cent fare counter is moved into operative position the actuator 45 will be moved axially to cause the three toothed portion thereof to engage one of the actuating gears for the trip total cash counter. When the actuator for the five cent cash fare counter is moved into operative position the actuator 45 will be moved in a direction to move the five toothed portion thereof into operative relation with the other of the actuating gears for said trip total cash counter. Thus, when the actuating shaft is rotated to cause either cash fare to be registered the value of that fare will be added to the total cash counters. This is accomplished by means of a cam and lever shifting device similar to those described in connection with the specific fare counters. The actuator 45 has a grooved collar 48 to receive a pin 49 carried by a lever 50 and having at its rear end a pin 51 to enter the groove in a cam 52 mounted upon the shaft 23. The development of this cam, as shown in Fig. 9, is such that when the cam shaft is in such a position that the actuator for either of the paper fare counters, that is, the ticket or the transfer, is in operative position the actuator 45 will be in its neutral position and that when the cam shaft is moved to a position to cause the actuator for the three cent fare counter to be moved into operative position the actuator 45 will be moved in one direction and when the actuator for the five cent fare counter is moved into operative position the actuator 45 will be moved in the opposite direction.

The operation of the machine as a whole will be readily understood from the foregoing description and it will be further understood that while we have shown the setting mechanism embodied in a particular type of fare register this mechanism is capable of embodiment, without material modification, in fare registers of other types and in registers generally which employ a plurality of counters which it is desired to operate selectively. Further, we wish it to be understood that while we have shown and described the particular embodiment of our invention we do not wish to be limited to the mechanism shown and described for obvious modifications will occur to a person skilled in the art.

Having thus fully described our inven- tion, what we claim as new and desire to secure by Letters Patent, is:—

1. The combination, with a plurality of counters, of a separate actuator for each counter, each actuator being capable of independent movement, a cam operatively connected to each actuator, said cams being successively arranged, and operating means common to all the cams for causing them to successively move the actuators into operative engagement with their counters.

2. The combination, with a plurality of counters, of a separate actuating device for each counter, each actuating device being independently shiftable, a separate shifting device for each actuating device, operating means common to all of said shifting devices, and means on said operating means so arranged as to successively operate said shifting devices to move the actuating devices into operative relation to the counters.

3. The combination, with a plurality of specific fare counters, of a separate independently movable actuator for each counter, and common operating means for said actuators, said operating means comprising an arrangement to independently move any actuator into operative relation to its counter without moving any other actuator into operative relation to its counter.

4. The combination, with a plurality of counters, of a separate independently movable actuator for each counter, and common operating means for said actuators constructed to independently move any actuator into operative relation to its counter, said common operating means also comprising an arrangement whereby the continuous motion of the same in the same direction will successively move the actuators into engagement with their counters, one actuator at a time being so moved.

5. The combination, with a plurality of counters, of a separate actuating device for each counter, each actuating device being movable into and out of operative relation with its counter, a separate cam connected with each of said actuating devices to move the same into and out of its operative position, and means for actuating the several cams in synchronism.

6. The combination, with a plurality of counters, and a separate actuating device for each counter, each actuating device being movable into and out of operative relation with its counter, a rotatable shaft, a plurality of cams mounted on said shaft, one of said cams being connected with each of said actuating devices to move the same into and out of its operative position, and means to rotate said shaft.

7. The combination, with a plurality of counters, of an actuator for each counter, each actuator being capable of axial movement, a shaft, a plurality of cams mounted on said shaft, each cam being operatively connected with one of said actuators to impart axial movement thereto, means for rotating said shaft, and means for imparting actuating movement to said actuators.

8. The combination, with a plurality of counters, of an actuator for each of said counters, each actuator being capable of axial movement to set the same and of a rotary movement to actuate its counter, a plurality of cams connected with the respective actuating devices, rotary means for imparting movement to said cams, and reciprocatory means for imparting rotation to said actuators.

9. The combination, with a plurality of counters, each of said counters comprising a gear, a plurality of actuating gears, each capable of axial movement to move it into and out of operative relation with the gear of one of said counters, a plurality of cams operatively connected with the respective actuator gears, means for actuating said cams to impart axial movement to said gears, and means for rotating said actuator gears.

10. The combination, with a plurality of counters, each of said counters comprising a gear, a plurality of actuating gears each capable of axial movement to move it into and out of operative relation with the gear of one of said counters, a plurality of cams operatively connected with the respective actuator gears, said cams being arranged to cause said gears to be actuated successively, and means for rotating said cams in synchronism.

11. The combination, with a plurality of counters including a plurality of cash fare counters and a total cash counter, a separate actuator for each of said counters, each actuator being movable into and out of operative relation with its counter, a plurality of cams operatively connected with the respective actuators, said cams being so arranged that when the actuator for one of said cash fare counters is moved into operative position the actuator for said total cash counter will also be moved into operative position, and means for actuating said cams in synchronism.

12. The combination, with a plurality of specific fare counters including a cash fare counter and a paper fare counter, and a total cash counter, of a separate actuating device for each of said specific fare counters and for said total cash counter, the actuating device for said total cash counter being adapted to add to said counter a number of units equal to the value of said cash fare counter, means for moving the actuators for said specific fare counters into and out of their operative positions, and means for causing the actuator for said total cash counter to be moved into its operative position when the actuator for said cash fare counter is moved into its operative position and to be moved into neutral position when the actuator for said paper fare counter is moved into its operative position.

13. The combination, with a plurality of alined counters, an actuator shaft arranged parallel with the axis of said counters, a plurality of actuators mounted on said actuator shaft, capable of axial movement thereon and held against rotation relatively thereto, a separate device for imparting axial movement to each of said actuators, and means for actuating said devices.

14. The combination, with a plurality of alined counters, an actuator shaft arranged parallel with the axis of said counters, a plurality of actuators mounted on said actuator shaft, capable of axial movement thereon and held against rotation relatively thereto, a separate cam for imparting axial movement to each of said actuators, and means for actuating said cams in synchronism.

15. The combination, with a plurality of alined counters, an actuator shaft arranged parallel with the axis of said counters, a plurality of actuators mounted on said actuator shaft, capable of axial movement thereon and held against rotation relatively thereto, a cam shaft, a separate cam for each of said actuators mountd on said shaft and arranged to impart axial movement to said actuators successively, and means for rotating said cam shaft.

16. The combination, with a plurality of alined counters, an actuator shaft extending parallel to the axis of said counters, a separate actuator for each of said counters slidably mounted on said shaft and held against rotary movement relatively thereto, a plurality of cams operatively connected with the respective actuators to slide the same on said shaft, means for actuating said cams, and means for rotating said actuator shaft.

17. The combination, with a plurality of alined counters, an actuator shaft extending parallel to the axis of said counters, a separate actuator for each of said counters slidably mounted on said shaft and held against rotary movement relatively thereto, a plurality of rotatable cams, levers for connecting said cams with the respective actuators, and means for rotating said cams in synchronism.

18. The combination, with a plurality of alined counters, of an actuator shaft, an actuating gear for each of said counters slidably mounted on said shaft and held against rotation relatively thereto, a grooved collar secured to each of said actuating gears, a lever pivotally supported between its ends and having at one end a pin to enter the groove in said collar, a plurality of grooved cams arranged adjacent to the opposite ends of said levers, each of said levers having a part adapted to enter the groove in its cam, and means for rotating said cams in synchronism.

19. The combination, with a plurality of alined counters, of an actuator shaft, an actuating gear for each of said counters slidably mounted on said shaft and held against rotation relatively thereto, a grooved collar secured to each of said actuating gears, a lever pivotally supported between its ends and having at one end a pin to enter the groove in said collar, a plurality of grooved cams arranged adjacent to the opposite ends of said levers, each of said levers having a part adapted to enter the groove in its cam, rotary means for actuating said cams in unison, and reciprocatory means for rotating said actuator shaft.

20. The combination, with a plurality of specific fare counters and a total counter, of a separate actuator for each counter, said actuators being independently shiftable and common operating means for said actuators, said operating means comprising an arrangement to independently shift any actuator for the specific fare counters into operative relation to its counter without shifting any other actuator for the specific fare counters into operative relation with its counter, said operating means also comprising an arrangement to shift the actuator for the total counter simultaneously with the shifting of an actuator for the specific fare counters, the direction in which the actuator for the total counter is shifted depending upon the actuator for the specific fare counters shifted.

In testimony whereof, we affix our signatures in presence of two witnesses.

DAVID B. WHISTLER.
JOHN E. McALLISTER.

Witnesses:
C. T. BURSON,
F. W. SCHAEFER.